United States Patent [19]
Jernigan, IV

[11] Patent Number: 5,623,651
[45] Date of Patent: Apr. 22, 1997

[54] METHOD AND SYSTEM FOR REPAIRING CROSS-LINKED CLUSTERS AND REATTACHING LOST DIRECTORIES ON A STORAGE DEVICE

[75] Inventor: Richard P. Jernigan, IV, Kirkland, Wash.

[73] Assignee: Microsoft Corporation, Redmond, Wash.

[21] Appl. No.: 263,204

[22] Filed: Jun. 21, 1994

[51] Int. Cl.⁶ .................................................. G06F 12/00
[52] U.S. Cl. ............................................ 395/616; 395/622
[58] Field of Search ................................... 395/481, 600

[56] References Cited

U.S. PATENT DOCUMENTS 4,941,059   7/1990   Grant ................................. 360/72.2

OTHER PUBLICATIONS

*PC Tools*™ Deluxe Version 6: Data Recovery DOS Shell, Beaverton, OR, Central Point Software, Inc. 1990. (pp. 279–280).

Minasi, Mark et al., *Inside MS–DOS 6*, Carmel, IN, New Riders Publishing, 1993 (pp. 750, 835–836).

Halliday, Caroline M., et al., Using PC Tools for Windows, pp. 397–406 1993.

*Primary Examiner*—Tod R. Swann
*Assistant Examiner*—Conley B. King, Jr.
*Attorney, Agent, or Firm*—Seed and Berry LLP

[57] ABSTRACT

An improved storage device repair mechanism is provided. The storage device repair mechanism of the preferred embodiment searches the storage device and detects cross-linked clusters and lost directories. In response to detecting a cross-linked cluster, the repair mechanism of the preferred embodiment duplicates the cross-linked cluster and attaches the cross-linked cluster to one of the cross-linked cluster chains. In response to detecting a lost directory, the repair mechanism of the preferred embodiment attaches the lost directory to the root directory.

9 Claims, 13 Drawing Sheets

METHOD AND SYSTEM FOR REPAIRING CROSS-LINKED CLUSTERS AND REATTACHING LOST DIRECTORIES ON A STORAGE DEVICE

TECHNICAL FIELD

The present invention relates generally to data processing systems and, more particularly, to the repairing of cross-linked clusters and reattachment of lost directories on a storage device.

BACKGROUND OF THE INVENTION

A common problem with management of information on permanent storage devices is lost directories. Most computer systems structure information contained on a permanent storage device of the computer system in a hierarchical fashion. This hierarchy ("the directory tree") starts with the root directory and the root directory further contains subdirectories and files. When a directory contains a subdirectory, the directory is known as the parent directory and the subdirectory is known as a child directory. There may be many levels of subdirectories emanating from the root directory. A user utilizes subdirectories to organize files and other subdirectories. A lost directory is a directory that for some reason cannot be accessed either directly or indirectly through the root directory. The problem of lost directories typically occurs as a result of the corruption of the directory in which the lost directory is referenced. This corruption can occur from either a hardware failure or from a computer program that executes in an undesirable fashion. For example, a computer program executing in an undesirable fashion may overwrite a portion of the root directory which may render a subdirectory referenced from the root directory "lost."

Another common problem with management of information is cross-linked clusters. In some computer systems, files are allocated on a cluster-by-cluster basis. A cluster is a unit of storage on the permanent storage device and is defined in terms of sectors. A sector is a physical division of the permanent storage device and is the smallest unit of access to the permanent storage device. In computer systems using the MS-DOS® operating system developed by the Microsoft Corporation of Redmond, Wash., a sector typically contains 512 bytes of information. One cluster typically is equivalent to four sectors. Since files are stored in terms of clusters, when a file contains more information than can be stored in one cluster, the file is then stored in a chain of clusters. The problem of cross-linked clusters refers to when, due to a hardware or software failure, the cluster chains for two files have at least one cluster in common. Thus, when a user modifies or deletes one of the cross-linked files, the other cross-linked file is also changed without the user knowing.

FIG. 1 depicts a typical prior art layout for a permanent storage device used by MS-DOS. The permanent storage device 102 contains a file allocation table (FAT) 104, a root directory 106, and data space 108. The FAT 104 is a table that references each cluster in each file stored in the data space 108. Thus, the FAT contains information about each cluster on the permanent storage device, and this information logically links clusters into a chain of clusters for each file. The root directory 106 is the highest directory in the directory tree on the permanent storage device 102. As such, the root directory 106 provides access to every subdirectory or file contained on the permanent storage device 102. The data space 108 is the area of the permanent storage device 102 in which all of the clusters that store subdirectories or files are contained.

FIG. 2 depicts a more detailed diagram of a prior art root directory 106. The structure of the root directory 106 is typical of all directories on the permanent storage device 102. The root directory 106 contains many entries, each of which either refers to a file or a directory. Each entry has the following fields: a file name 202, an extension 204, an attribute 206, reserved space 208, a time of update 210, a date of update 212, a beginning cluster 214, and a file size 216. The file name field 202 contains the actual file or directory name corresponding to the entry. The file name field 202 can be up to eight bytes long. The extension field 204 contains the file name extension or directory name extension for the entry. The extension field 204 is 3 bytes long. An example of an extension to a file name is "EXE" when the entry refers to an executable file. The attribute field 206 contains the attribute for the directory or file corresponding to the entry. The attribute of a file indicates both the type of file or directory, represented by the entry and the accessibility to the file or directory. For instance, the entry may refer to a subdirectory or system file. In addition, the accessibility of the file or directory may be read only or hidden. The reserved field 208 is 10 bytes long and is a field reserved for future use. The time of update field 210 is 2 bytes long and indicates the time that the file or directory was last modified. The date of update field 212 is 2 bytes long and indicates the date on which the last modification to the file or directory occurred. The beginning cluster field 214 is 2 bytes long and contains the cluster number of the first cluster used in storing the information contained in a file. The file size field 216 is a 4 byte field which contains the length of the file in terms of bytes. One entry contained in all directories except the root directory is the ".." entry which refers to the parent directory.

FIG. 3 depicts a more detailed diagram of a prior art FAT 104. The FAT 104 contains an entry for each cluster in the data space 108. The FAT 104 is responsible for maintaining a logical link between each cluster used in storing information for a file. The entries in the FAT 302, 304, 306, 308 can contain a value of zero if the cluster is not allocated to a file, a valid cluster number if the cluster is allocated to a file or an end-of-file marker if the cluster indicated by the entry is the last cluster in a chain of clusters for a given file. When an entry in the FAT 104 contains a valid cluster number, the cluster number contained in the entry is that of the next cluster used in storing information for the given file. Thus, the FAT 104 links all clusters for a given file by having the entry for each cluster refer to the next cluster used for the file, with the entry for the last cluster containing an end of file marker.

FIG. 4 depicts a flowchart of the typical steps used in the prior art to access information contained in a file. In order to access information, a calling computer program passes the file name of a desired file and a logical location of the requested information (in reference to the beginning of the file) to the computer program responsible for file access, usually the operating system. In step 402, the operating system searches the root directory or various subdirectories for the file name of the desired file. In step 404, the operating system examines the associated entry for the file name and obtains the cluster number of the first cluster which stores information for the file. In step 406, the operating system accesses the FAT with the first cluster number. The accessed entry in the FAT corresponding to the first cluster number contains either an end-of-file marker if the file is only one cluster in length or, otherwise, contains a valid cluster number which is the next cluster used in storing information for the file. The operating system chains through the entries in the FAT until reaching the FAT entry corresponding to the cluster that contains the requested information. In step 408, after chaining through the FAT entries to obtain the appropriate cluster number for the requested information, the operating system accesses the cluster in data space 108 to obtain the requested information. In step 410, the operating system returns the requested information to the calling computer program and the calling computer program can then use the returned information for the processing of the calling program.

FIGS. 5A and 5B depict a flowchart of the steps performed by a prior art system (chkdsk) for repairing permanent storage devices. The chkdsk system is sold as part of the MS-DOS operating system by the Microsoft Corporation of Redmond, Wash. A user can run the chkdsk system either periodically for preventive maintenance or when the user notices a loss of a significant amount of information. That is, the user can no longer utilize a directory. The chkdsk system searches the directory tree starting with the root directory and finds chains of clusters that are marked as "in use" by the FAT, but are inaccessible through the directory tree. (A cluster is "in use" if the corresponding FAT entry contains a non-zero value.) Such chains of clusters are considered "lost." After finding a lost chain of clusters, the chkdsk system enters the lost chain as a file entry in the root directory.

In step 502, the chkdsk system first walks the directory tree and marks 1 bit in a bitmap for each cluster on the permanent storage device encountered. Each bit in the bitmap corresponds to one cluster in the data space on the permanent storage device. Walking the directory tree will be discussed in more detail below. In steps 506 through 516, the chkdsk system selects each entry in the FAT and determines whether each entry corresponds to a lost cluster. After steps 506 through 516 are completed, the bitmap will only have bits set for clusters that were marked as in use by the FAT, but were inaccessible from the directory tree. In step 506, the chkdsk system selects the next entry in the FAT starting with the first. In step 508, the chkdsk system determines if the selected entry in the FAT is in use. If the selected entry in the FAT is not in use, processing continues to step 516 wherein the chkdsk system determines if there are more entries in the FAT. In step 510, if the selected entry in the FAT is in use, the chkdsk system toggles the corresponding bit in the bitmap. In step 516, the chkdsk system determines if there are more entries in the FAT to be examined. If there are more entries in the FAT to be examined, processing continues to step 506 and the next entry in the FAT is selected. However, if there are no more entries in the FAT, processing continues to step 518 in FIG. 5B.

In steps 518 through 522, the chkdsk system determines which bits in the bitmap correspond to the heads of lost cluster chains. In step 518, the chkdsk system selects the next set bit in the bitmap, starting with the first bit. In step 520, the chkdsk system uses the FAT to determine all subsequent clusters in the cluster chain indicated by the set bit and unmarks the corresponding bits to the subsequent clusters from the bitmap. Step 520 is performed so that after each set bit in the bitmap is processed only the head cluster in each chain of lost clusters is left. In step 522, the chkdsk system determines if there are more set bits in the bitmap. If more bits are set in the bitmap, processing continues to step 518 wherein the next set bit in the bitmap is selected. However, if no more bits are set in the bitmap, processing continues to step 524. In step 524, for each set bit in the bitmap, the chkdsk system enters the corresponding cluster as a file entry in the root directory. Thus, the chkdsk system enters all lost chains of clusters, whether the chain was a file or a directory, as a file entry in the root directory. Since MS-DOS does not allow for converting files to directories, when utilizing the chkdsk system, lost directories are unrecoverable.

FIG. 6 depicts a flowchart of the steps performed by the prior art walk directory tree routine. The walk directory tree routine performs a depth first, left-to-right traversal of the directory tree. For each cluster encountered during the traversal, the walk directory tree routine marks a bit in a bitmap; the bit marked corresponding to the cluster encountered. The bitmap contains 1 bit for each cluster on the permanent storage device and is initially set to zero. Thus, when the walk directory tree routine has completed, the bitmap contains bits set for each cluster encountered during the traversal of the directory tree. The walk directory tree routine receives a directory as input. The walk directory tree routine is first invoked with the root directory. Although the walk directory tree routine is described as being a recursive algorithm, one skilled in the art will appreciate that the walk directory tree routine could be implemented using other methods such as an iterative method. In step 602, the walk directory tree routine selects the next entry in the directory received as a parameter ("the parameter directory") starting with the first entry. In step 604, the walk directory tree routine accesses each cluster for the selected entry using the FAT while marking a corresponding bit in a bitmap for each cluster accessed. In step 606, the walk directory tree routine determines if the selected entry is a directory entry. The walk directory tree routine determines if the selected entry is a directory entry by examining the attribute field in the selected entry. In step 608, if the selected entry is a directory entry, the walk directory tree routine makes a recursive call with the selected entry. In step 610, the walk directory tree routine determines if there are more entries in the parameter directory. If there are more entries in the parameter directory, processing continues to step 602 wherein the next entry in the parameter directory is selected. However, if no more entries are contained within the parameter directory, the walk directory tree routine returns to higher level processing.

In regard to the problem of cross-linked clusters, there are several methods for fixing cross-linked clusters which are unsatisfactory for the reasons described below. A first method for repairing cross-linked clusters is to manually copy the cross-linked files from the original permanent storage device to a second permanent storage device, delete the cross-linked files from the original permanent storage device and then copy the cross-linked files back to the original permanent storage device. Although this method does fix cross-linked clusters, this method requires a computer user to identify the files that are cross-linked and to manually make copies. This method is time consuming and difficult to perform for novice computer users.

The second method for fixing cross-linked clusters is a computer program that identifies cross-linked clusters and randomly truncates one of the links to the cross-linked cluster. Usually when a cross-link occurs, one of the files is correctly connected to the cross-linked cluster and the other file is incorrectly connected to the cross-linked cluster due to a hardware or software failure. Thus, randomly disconnecting one file from the cross-linked cluster may disconnect the correctly connected file and render both files unusable.

SUMMARY OF THE INVENTION

In accordance with the present invention, a method is executed in a computer system having a storage device. This method repairs storage devices by reattaching lost directories and uncrossing cross-linked clusters. This method of the present invention reattaches lost directories by identifying lost cluster chains, determining the head cluster of the lost cluster chain, determining if the head of the lost cluster chain is a directory entry, and reattaching the lost cluster chain as a directory entry in the root directory. This method of the present invention uncrosses cross-linked clusters by determining when a cluster is cross-linked, copying the cross-linked cluster to a newly allocated cluster, and attaching the newly allocated cluster to one of the cross-linked cluster chains. Thus, the present invention provides for an improved method and system for repairing storage devices by recovering lost directories that may then be utilized as directories and uncrossing cross-linked clusters.

DETAILED DESCRIPTION OF THE INVENTION

The present invention provides an improved repair mechanism for a storage device. The present invention repairs storage devices by reattaching lost directories and uncrossing cross-linked clusters. The present invention reattaches lost directories in a first and efficient manner. The present invention locates lost directories, identifies lost directories as directories, and reattaches lost directories so that the lost directories may be utilized. The repair of cross-linked clusters by the present invention provides reliability through the prevention of the loss of data, minimizes memory utilization, and minimizes processing time. The present invention repairs cross-linked clusters by identifying cross-linked clusters, copying the cross-linked cluster into a newly allocated cluster and attaching the newly allocated cluster into one of the cross-linked cluster chains. By reattaching lost directories as directories and uncrossing cross-linked clusters, the present invention is an improved storage device repair mechanism.

Figure 1:
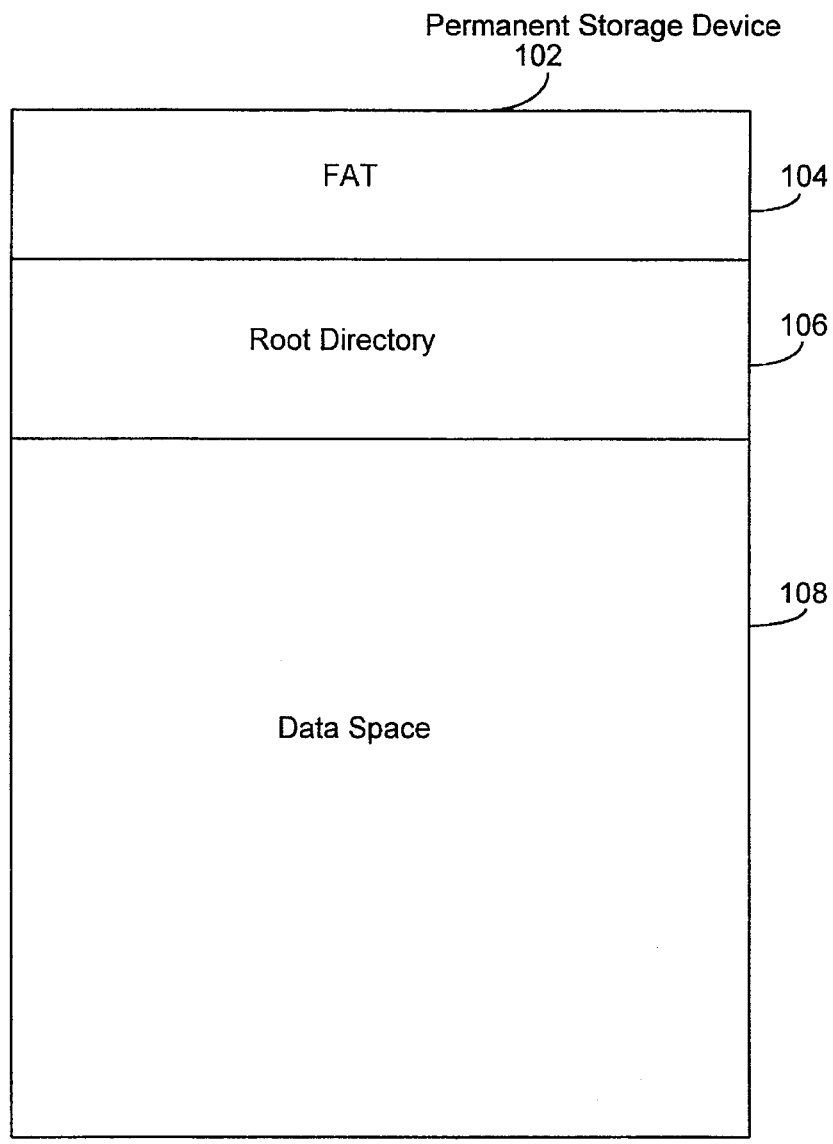
FIG. 1 depicts a typical structure of a prior art permanent storage device.
Figure 2:
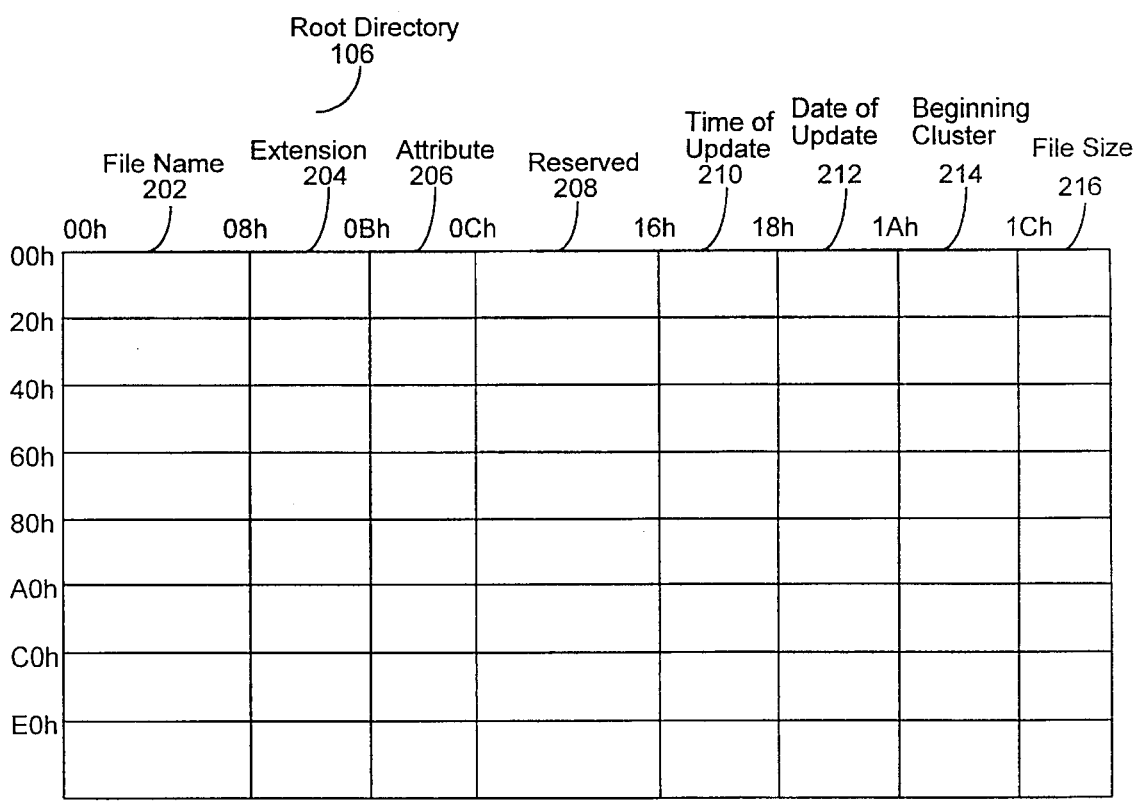
FIG. 2 depicts a more detailed block diagram of a prior art root directory of the permanent storage device of FIG. 1.
Figure 3:
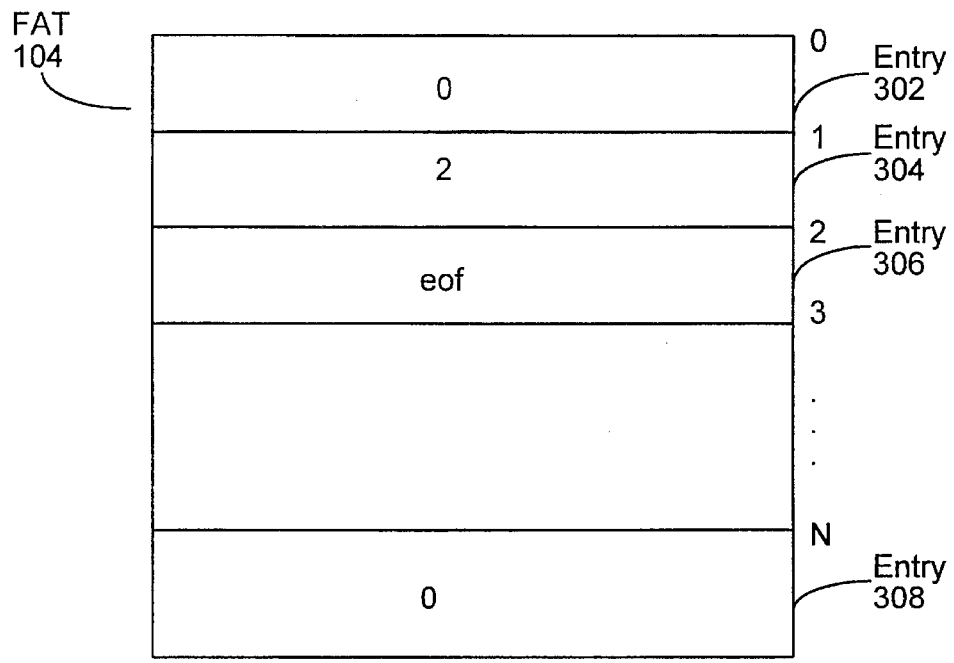
FIG. 3 depicts a more detailed block diagram of a prior art file allocation table of the permanent storage device of FIG. 1.
Figure 4:
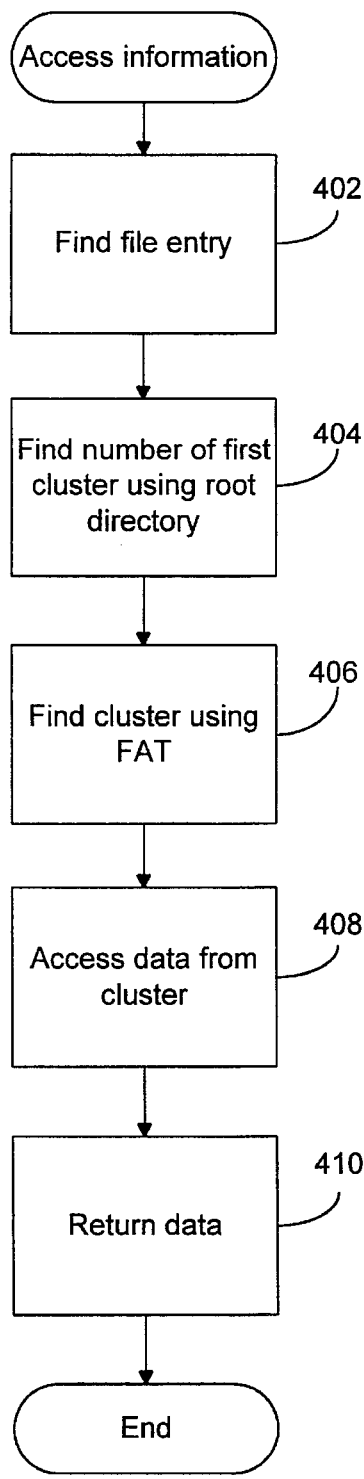
FIG. 4 depicts a flowchart of the steps utilized in the prior art to access the permanent storage device of FIG. 1.
Figure 5A:
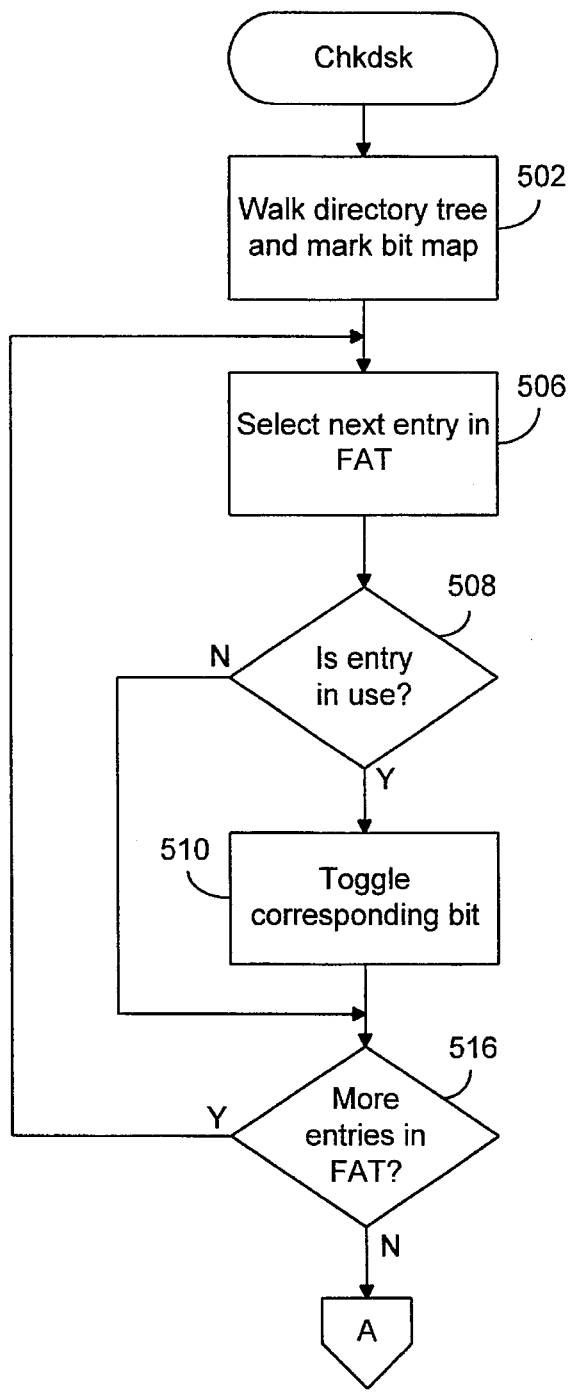
FIGS. 5A and 5B depict a flowchart of the steps performed by a prior art permanent storage device repair system.
Figure 5B:
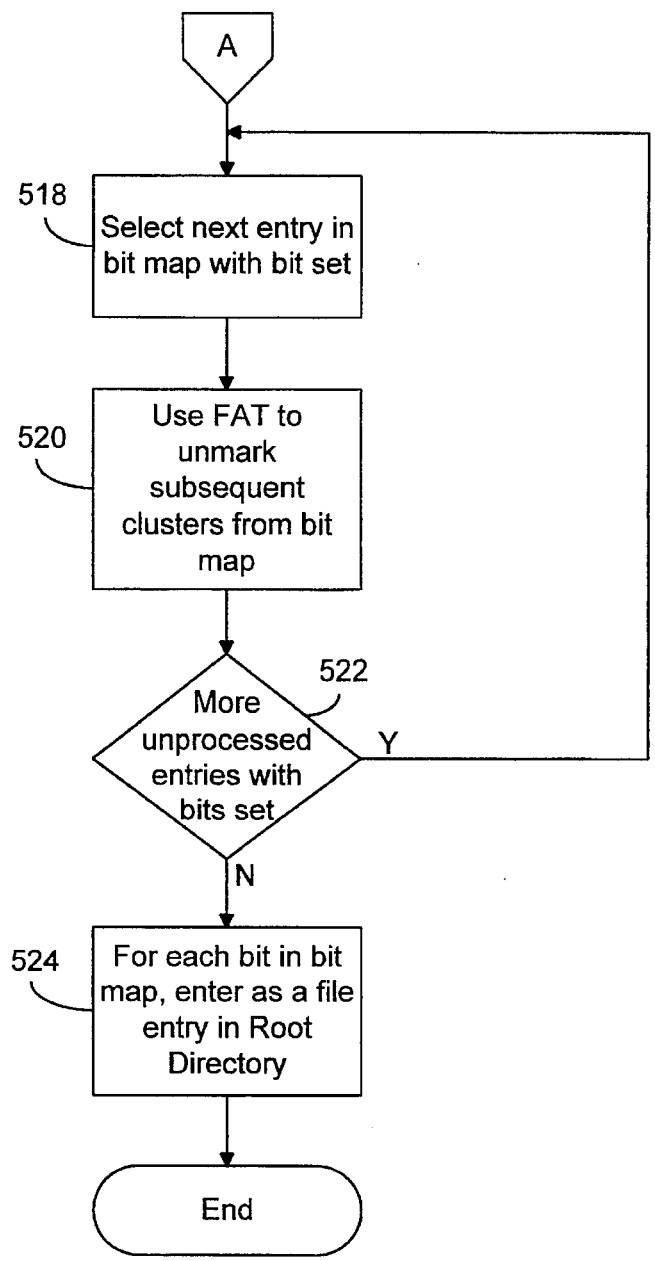
Figure 6:
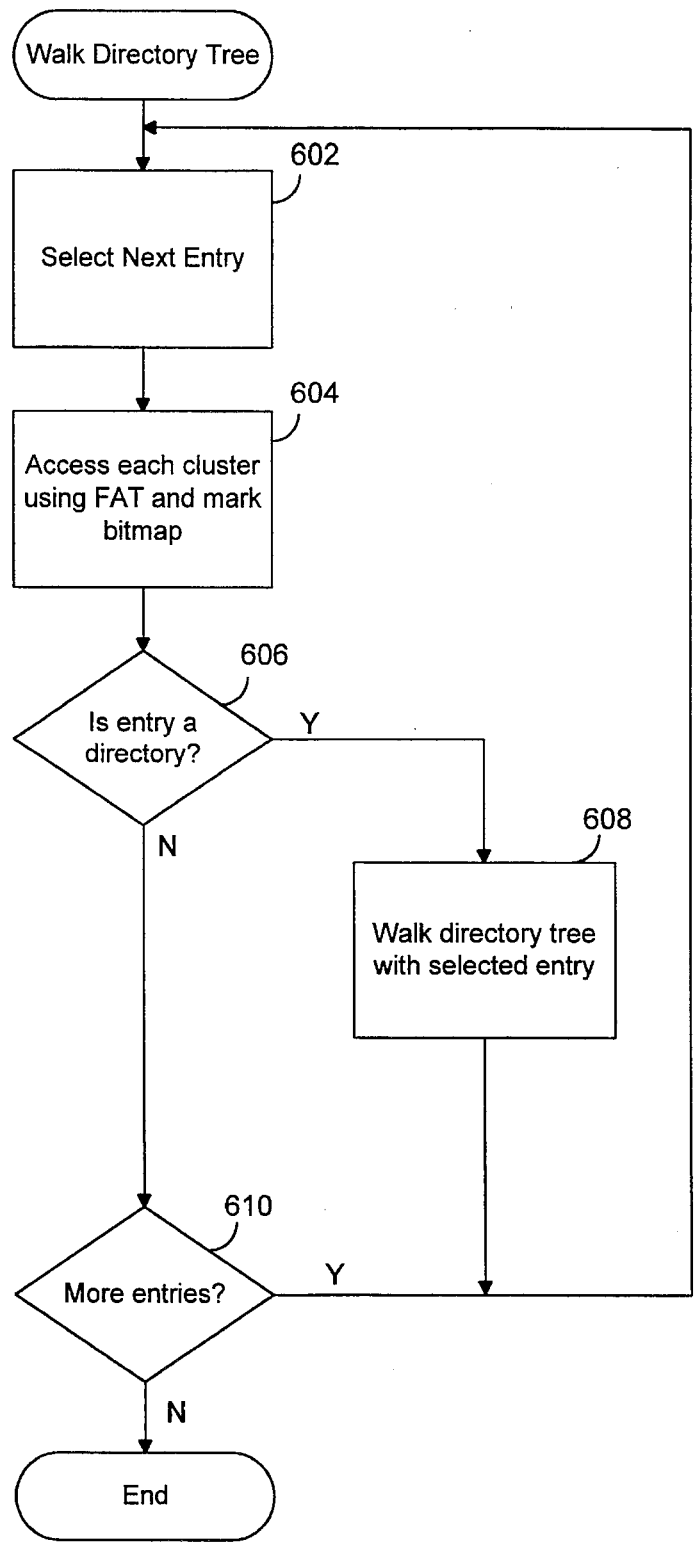
FIG. 6 depicts a flowchart of the steps performed by a prior art walk directory tree routine.
Figure 7:
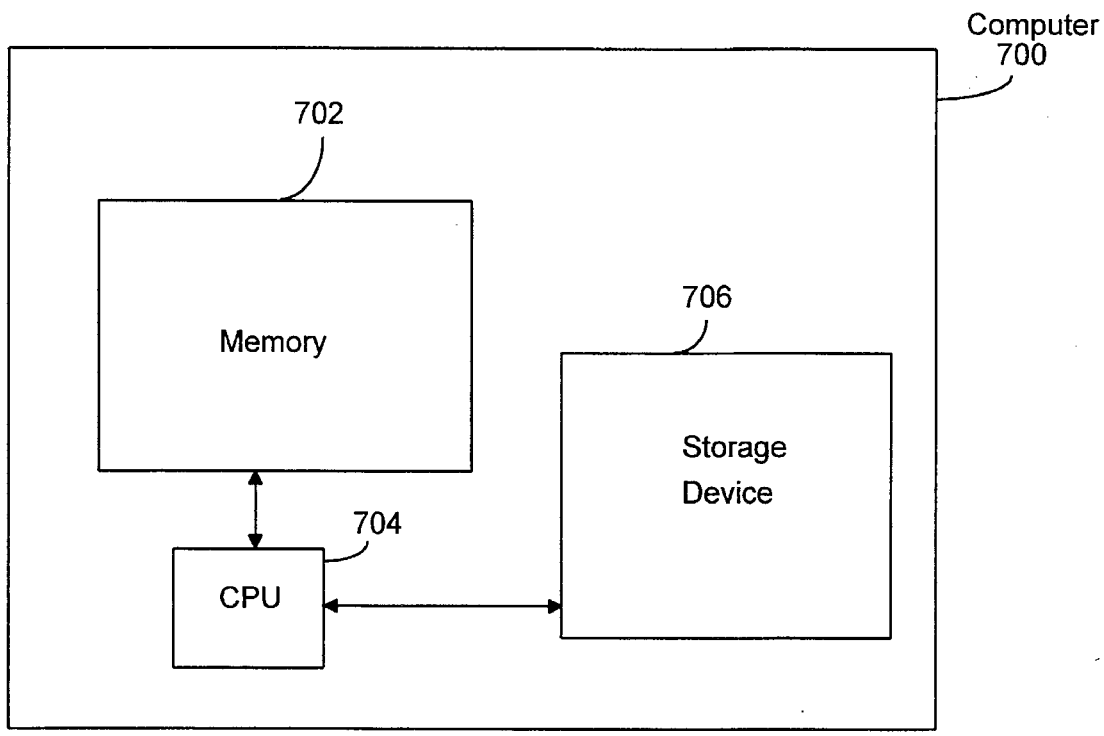
FIG. 7 depicts a block diagram of a computer suitable for practicing a preferred embodiment of the present invention.

FIG. 7 depicts a block diagram of a computer suitable for practicing a preferred embodiment of the present invention. The computer 700 contains a memory 702, a central processing unit (CPU) 704, and a storage device 706. The memory 702 acts as a storage area for computer programs being executed by the CPU 704. The CPU 704 transfers information between the storage device 706 and the memory 702 and executes computer programs residing within the memory 702. The storage device 706 is a secondary storage device for maintaining information. The storage device 706 can be any of a number of different storage devices including, but not limited to, hard disks, floppy disks, and compact discs.

Figure 8:
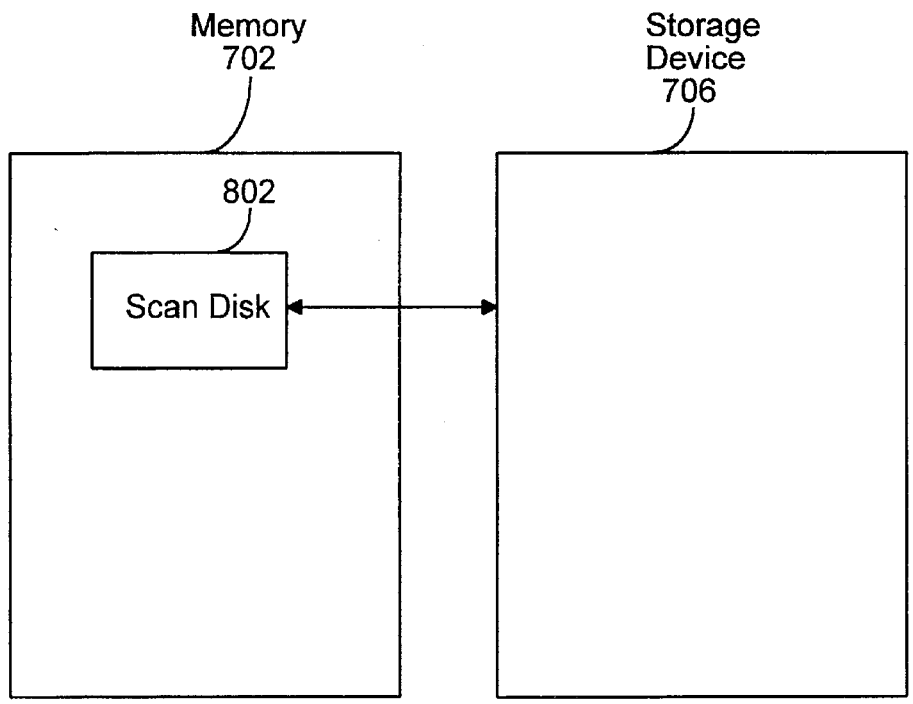
FIG. 8 depicts a more detailed diagram of the memory of a computer system suitable for practicing a preferred embodiment of the present invention.

FIG. 8 depicts the present invention within the memory of a computer system. The preferred embodiment of the present invention, the scan disk mechanism 802, resides within the memory 702 of a computer. The scan disk mechanism 802, while in the memory 702 of a computer, operates upon the storage device 706 of the computer. Although the present invention is described as operating upon the storage device within a computer system, one skilled in the art will appreciate that the present invention can be used on a storage device not contained within a computer system. Further, the present invention can be used on storage devices of other electronic equipment. In addition, one skilled in the art can appreciate that the present invention can be used on primary storage devices.

Figure 9:
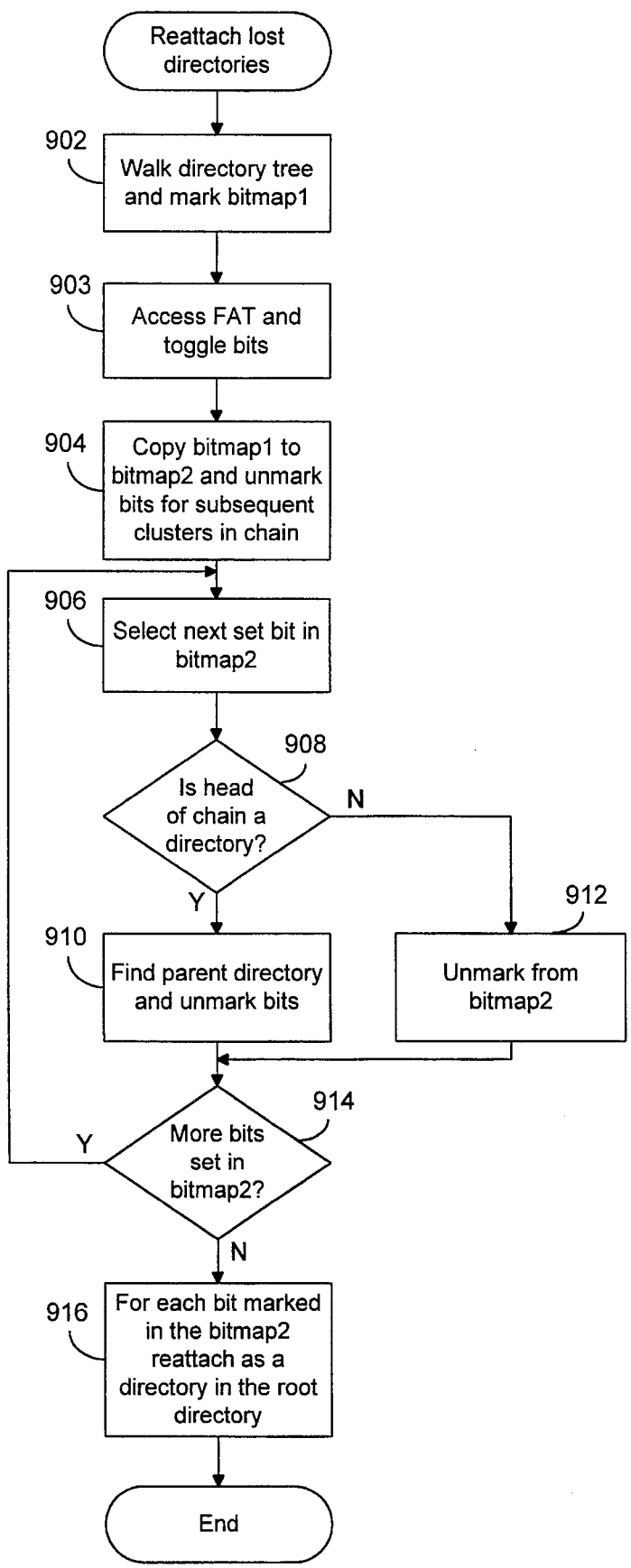
FIG. 9 depicts a flowchart of the steps performed by the scan disk mechanism of the present invention for reattaching lost directories.

FIG. 9 depicts a flowchart of the steps performed by the scan disk mechanism 802 for reattaching lost directories. When reattaching lost directories, the scan disk mechanism 802 uses only two bitmaps, thereby saving memory, and attaches lost directories as directory entries within the root directory. The scan disk mechanism reattaches lost directories by walking the directory tree, accessing the FAT to determine lost clusters, finding the head of each lost cluster chain, determining whether the head of each lost cluster chain is a directory entry, and, if so, entering the lost directory as a directory entry in the root directory. After the lost directory has been added to the root directory as a directory entry, a computer user or a computer program may access the lost directory and utilize the information contained therein. In step 902, the scan disk mechanism 802 first walks the directory tree and marks a bitmap (bitmap1) by setting each bit in bitmap1 for each corresponding cluster encountered. In step 903, the scan disk mechanism 802 accesses the FAT and toggles the corresponding bit in the bitmap for each FAT entry in use. In step 904, the scan disk mechanism 802 copies bitmap1 to another bitmap (bitmap2). Also, the scan disk mechanism edits bitmap2 so that the only bits set in bitmap2 correspond to those clusters that are at the head of a lost cluster chain. The scan disk mechanism edits bitmap2 by performing the following: for each set bit in bitmap2 the scan disk mechanism accesses the FAT and unmarks any bit that is set in bitmap2 that corresponds to a subsequent cluster in the cluster chain. After performing this algorithm on each set bit in bitmap2, bitmap2 will only contain one bit for each head of a lost cluster chain.

In steps 906 through 914, the scan disk mechanism 802 processes bitmap2 so that the only bits remaining set are bits corresponding to parent directory entries. In step 906, the scan disk mechanism 802 selects the next set bit in bitmap2, starting with the first. In step 908, the scan disk mechanism 802 determines for each set bit in bitmap2 whether the corresponding cluster is a directory cluster. The scan disk mechanism 802 makes this determination by examining the corresponding cluster of the set bit. The scan disk mechanism 802 assumes that the cluster is a directory and examines each entry in the corresponding cluster to determine if each field within each entry contains valid data for a directory. For example, the scan disk mechanism 802 checks to see if the file names contain valid characters, the file attributes are valid, and the beginning cluster numbers are within the valid range of cluster numbers for each entry within the cluster. Since at the time that a directory cluster is first allocated, the directory cluster is zeroed out, in addition to checking the entries in use, the scan disk mechanism 802 checks the unused entries in the directory to ensure that the unused entries contain all zeroes. If any of the used or unused entries are invalid, the scan disk mechanism 802 determines that the cluster being examined is not a directory. If the head of the chain is not a directory cluster, processing continues to step 912. If the head of the chain is a directory cluster, however, processing continues to step 910 in which the scan disk mechanism 802 determines the parent of the directory cluster. If the parent directory is also the head of a lost cluster chain, then the child directory is automatically reattached when the parent is reattached. The scan disk mechanism 802 finds the parent of the directory cluster ("the child directory") by accessing the ".." entry of the child directory. After the ".." entry is accessed, the bit corresponding to the child directory is unmarked if the parent is ensured to be reattached, which will provide accessibility to the child directory. To ensure that the parent will be reattached, the scan disk mechanism 802 determines if the corresponding bit in bitmap1 is set for the parent directory. If the corresponding bit in bitmap1 is set for the parent directory, the parent directory will be reattached and, thus, the accessibility of the child directory can be ensured. In step 914, the scan disk mechanism 802 determines whether there are more set bits in bitmap2. If more bits are set in bitmap2, processing continues to step 906 wherein the next set bit in bitmap2 is selected. However, if no more bits are set in bitmap2, processing continues to step 916. In step 916, the scan disk mechanism 802 accesses bitmap2 and for each set bit in bitmap2 reattaches the corresponding cluster as a directory entry in the root directory. Although the present invention has been described as reattaching lost directories using two bitmaps, one skilled in the art will appreciate that a different number of bitmaps can be used, such as three.

Figure 10A:
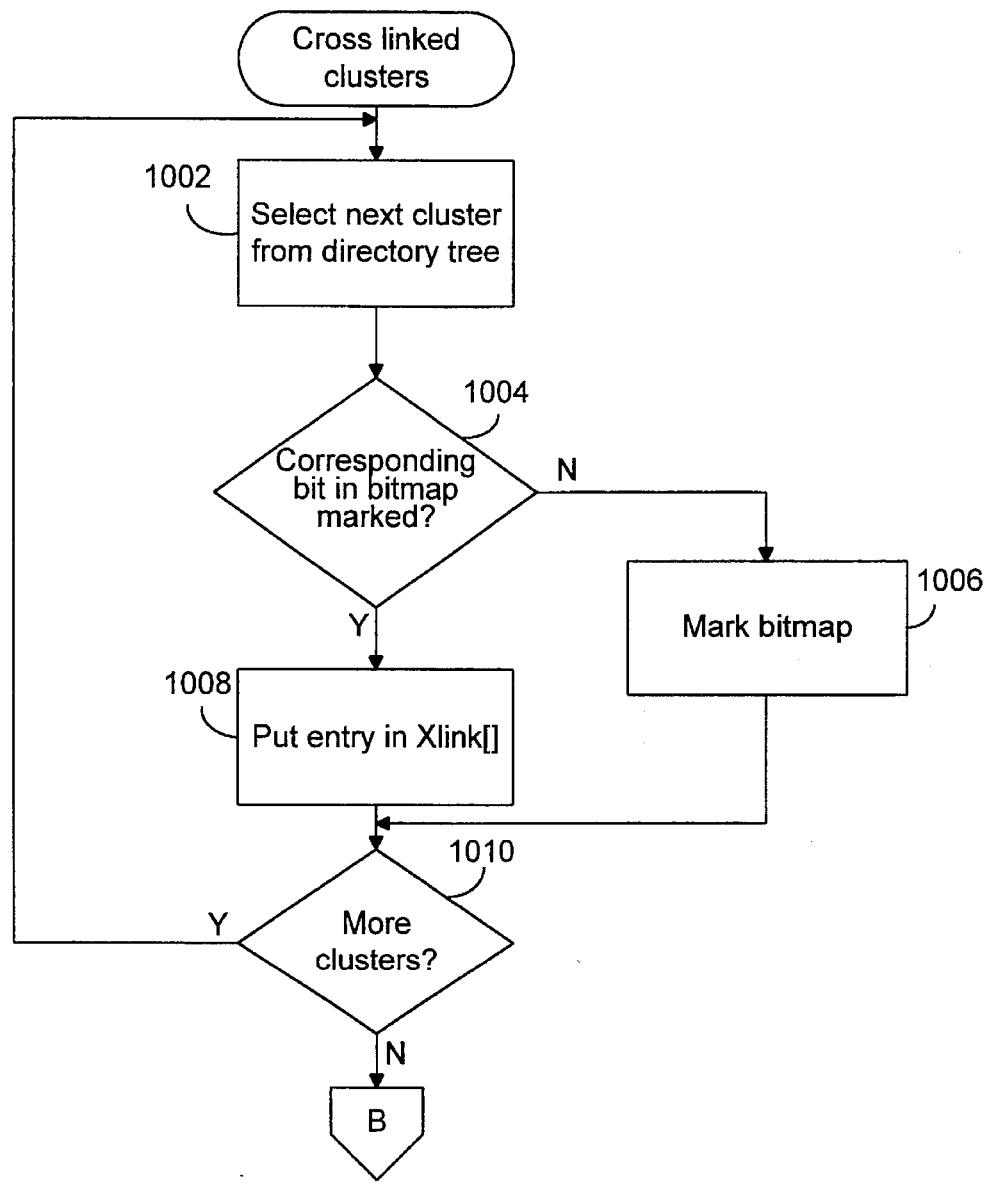
FIGS. 10A and 10B depict a flowchart of the steps performed by the scan disk mechanism of the present invention for repairing cross-linked clusters.
Figure 10B:
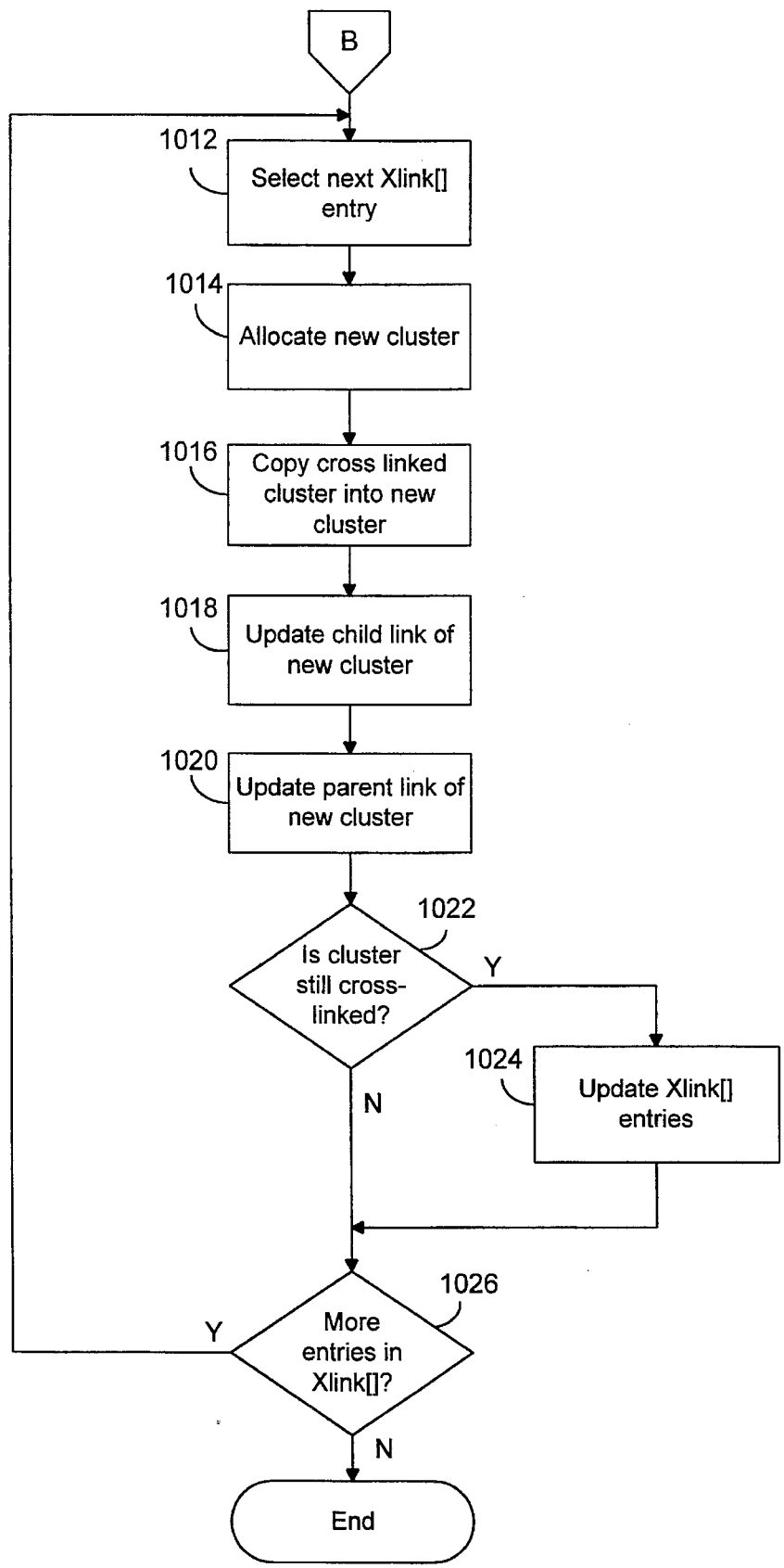

FIGS. 10A and 10B depict a flowchart of the steps performed by the scan disk mechanism 802 for repairing cross-linked clusters. The scan disk mechanism 802 repairs cross-linked clusters automatically (without human intervention) and duplicates each cross-linked cluster chain so as to prevent the loss of information. The scan disk mechanism 802 repairs cross-linked clusters by identifying cross-linked clusters through walking the directory tree, setting bits in a bitmap for each cross-linked cluster encountered, creating an entry for each cross-linked cluster in an xlink array, and fixing each cross-linked cluster as indicated in the xlink array. The xlink array is an array of structures. Each structure in the xlink array contains three entries: (1) the cluster number of the cross-linked cluster. (2) a reference to the directory entry from which the cluster was found, and (3) a flag indicating whether the cross-linked cluster has been fixed. Recall that the directory entry from which the cluster was found includes the file name, the extension, the attributes and the beginning cluster number. In steps 1002 through 1010, the scan disk mechanism 802 identifies all cross-linked clusters. In step 1002, the scan disk mechanism 802 first selects the next cluster from the directory tree, starting with the first encountered in a depth-first, left-to-right traversal of the directory tree as described in the background section. In step 1004, before marking a bit in the bitmap for the selected cluster, the scan disk mechanism 802 determines whether the corresponding bit in the bitmap for the selected cluster is already marked. If the corresponding bit in the bitmap is already marked, the selected cluster has previously been selected through a different path in the directory tree. A cluster that is on two paths is a cross-linked cluster. In step 1008, if the corresponding bit is already marked, the scan disk mechanism 802 creates an entry in the xlink array for the selected cluster. However, if the corresponding bit in the bitmap is not already marked, in step 1006, the scan disk mechanism 802 marks the corresponding bit of the selected cluster in the bitmap. In step 1010, the scan disk mechanism 802 determines whether there are more clusters in the directory tree. If there are more clusters in the directory tree that have not been selected, processing continues to step 1002 and the scan disk mechanism 802 selects the next cluster from the directory tree in a depth-first, left-to-right traversal. However, if there are no more clusters in the directory tree to be examined, processing continues to step 1012 in FIG. 10B. At this point in the flowchart, the xlink array contains at least one entry for each cross-linked cluster.

After identifying all cross-linked clusters, in steps 1012 through 1026, the scan disk mechanism 802 fixes the cross-linked clusters. The scan disk mechanism 802 fixes cross-linked cluster chains by duplicating the cross-linked clusters in the cluster chains and attaching the duplicated clusters to one of the cluster chains. Thus, one cluster chain contains the original cluster and the other cluster chain contains the duplicate cluster. In step 1012, the scan disk mechanism 802 selects the next xlink array entry, starting with the first. In step 1014, the scan disk mechanism 802 allocates a new cluster. In step 1016, the scan disk mechanism 802 copies the cluster indicated by the selected xlink array entry ("selected cluster") into the newly allocated cluster. In step 1018, the scan disk mechanism 802 updates the FAT entry of the newly allocated cluster ("child link") to refer to the next sequential cluster in the cluster chain. Each cluster in the cluster chain has both a parent and a child link. The parent link refers to the FAT entry for the previous cluster in the chain of clusters or if there is no previous cluster, the directory from which the cluster chain was accessed. The child link is a reference to the next cluster in the cluster chain (i.e., the FAT entry for the selected cluster). If the cluster being examined is the last cluster in the cluster chain, the child link will indicate an end of file marker. In step 1020, the scan disk mechanism 802 updates the parent link of the new cluster to point to the newly allocated cluster and marks the entry in the xlink array for the cross-linked cluster as being fixed. Steps 1018 and 1020 are performed in this specific order so as to provide reliability in fixing a cross-linked cluster. If a failure, due to hardware or software, were to occur during the time between step 1018 and step 1020, no information would be lost; the result would be that an extra cluster would be allocated in the storage device and the extra cluster would not be used. However, if step 1020 were to occur before step 1018 and a failure occurred during the time between the two steps, the subsequent clusters in the cluster chain after the newly allocated cluster would not be accessible because the child link was not set, thereby losing information.

In step 1022, the scan disk mechanism 802 determines whether the selected cluster is further cross-linked (i.e., more than two cluster chains refer to the selected cluster).

The scan disk mechanism 802 determines if the selected cluster is further cross-linked by examining all of the entries in the xlink array and comparing the number of the selected cluster with the cluster numbers of the entries in the xlink array. If the scan disk mechanism 802 determines that the selected cluster has additional entries in the xlink array, in step 1024, the scan disk mechanism 802 updates the entries in the xlink array to refer to the newly allocated cluster under the following conditions: the flag in the entry indicates that the entry has not been fixed and the parent of the selected cluster is a cluster and not a directory. The thrust of this test is to ensure that the FAT entries and the xlink array entries for a cluster chain do not become out of synchronization. Thus, this step is performed to ensure the integrity of the cross-linked cluster chains. For example, if a cross-linked cluster were referenced in three cluster chains (A, B and C) with the cross-linked cluster being the head cluster for one of the cluster chains (A), upon uncrossing the cross-linked cluster, a situation may arise that could lead to a breach of the integrity of the cluster chains. If xlink entries were generated for B and C and the xlink entry for the cross-linked cluster with respect to B has been fixed, the FAT entry corresponding to the cross-linked cluster for the C cluster chain will refer to the newly allocated cluster, whereas the entry in the xlink array corresponding to the cross-linked cluster for the C cluster chain will still refer to the original cross-linked cluster. Thus, unless the xlink array entry referring to the cross-linked cluster in the C cluster chain is updated, the newly allocated cluster will remain cross-linked. In step 1026, the scan disk mechanism 802 determines if there are more entries in the xlink array to be processed. If there are more entries in the xlink array to be processed, processing continues to step 1012 wherein the scan disk mechanism 802 selects the next entry in the xlink array to be processed. However, if there are no more entries in the xlink array to be processed, processing ends.

Figure 11:
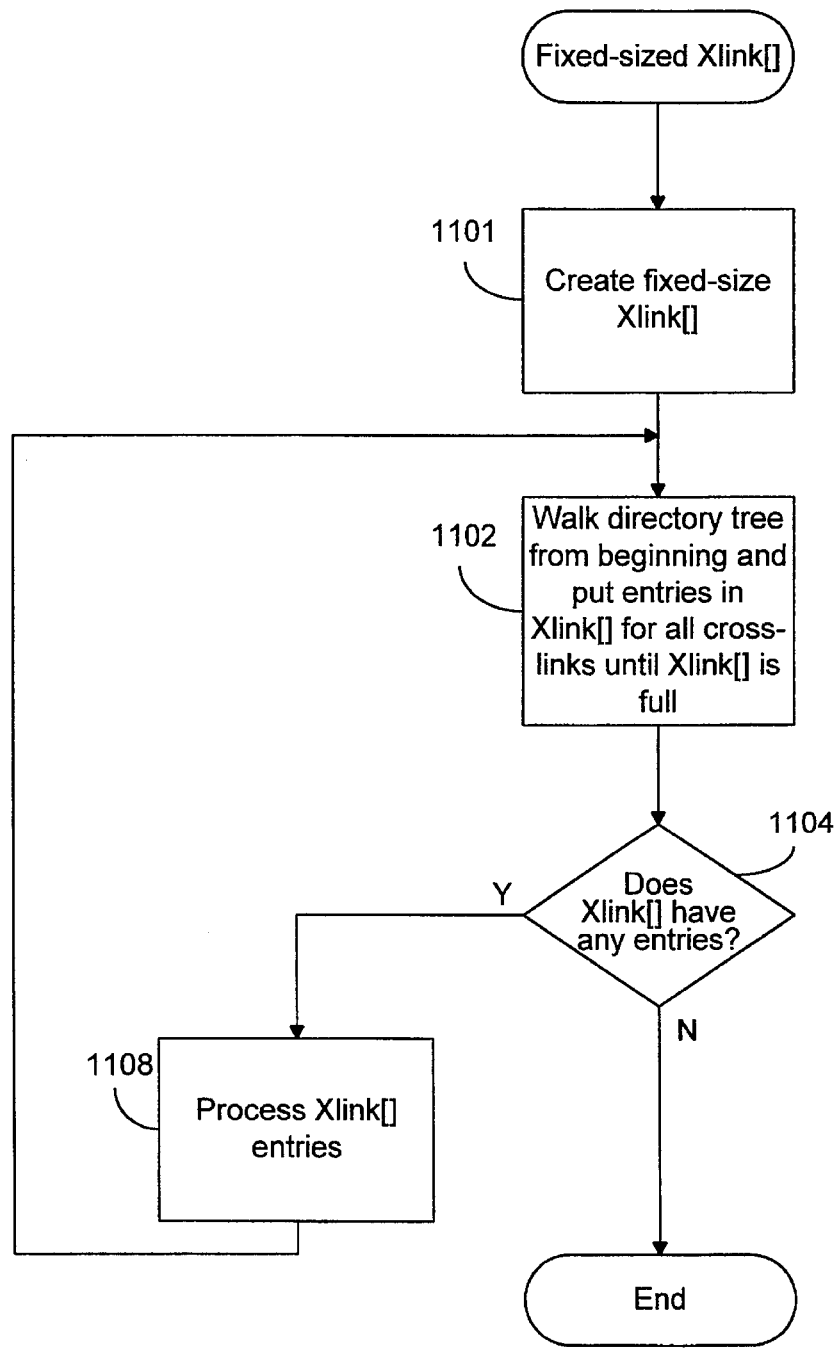
FIG. 11 depicts a flowchart of the steps performed by the scan disk mechanism of the present invention when using a fixed-size xlink array.

In repairing cross-linked clusters, the scan disk mechanism 802 provides an additional feature of utilizing a fixed-size xlink array. The scan disk mechanism 802 of the present invention utilizes a fixed-size xlink array to prevent a situation from occurring where the xlink array grows beyond the amount of available memory and as a result, a memory error occurs. That is, the scan disk mechanism 802 of the present invention creates a fixed-size xlink array with the size being based on the amount of available memory and then utilizes the fixed-size xlink array when uncrossing cross-linked clusters. FIG. 11 depicts a flowchart of the steps performed by the scan disk mechanism 802 for utilizing a fixed-size xlink array. In step 1101, the scan disk mechanism 802 creates a fixed-size xlink array based on the available memory of the computer 700. In step 1102, the scan disk mechanism 802 walks the directory tree and places entries into the xlink array for all cross-links encountered until the xlink array is full of entries. The processing in step 1102 is similar to that already described in FIGS. 10A and 10B. In step 1104, the scan disk mechanism 802 determines whether the xlink array has any entries. If the xlink array contains entries, processing continues to step 1108 wherein the scan disk mechanism 802 fixes the cross-linked clusters corresponding to the xlink entries. The process of fixing the cross-linked clusters is similar to that described in FIGS. 10A and 10B. After the scan disk mechanism 802 has processed all the xlink array entries, the scan disk mechanism continues to step 1102 wherein the scan disk mechanism again walks the directory tree from the beginning and places entries into the xlink array for all cross-linked clusters encountered until the xlink array becomes full. If, however, the xlink array does not contain any entries, processing ends.

The present invention provides for an improved method and system for repairing storage devices. Conventional systems are unable to either reattach lost directories as directories or uncross cross-linked clusters. The present invention is an improvement over conventional systems by reattaching lost directories as directories and uncrossing cross-linked clusters. Thus, the present invention provides a preferred storage device repair mechanism.

While the present invention has been described with respect to a preferred embodiment thereof those skilled in the art will know of various changes in form that may be made without departing from the spirit and scope of the claimed invention as defined in the appended claims.

I claim:

1. In a computer system, the computer system having a storage device containing clusters, each cluster being a part of a cluster chain, a method for uncrossing cross-linked clusters comprising the computer-implemented steps of:

determining when a first of the cluster chains and a second of the cluster chains contain a common cluster:

duplicating the common cluster; and updating the first cluster chain to refer to the duplicated cluster, wherein the second cluster chain continues to refer to the common cluster.

2. The method of claim 1 wherein the storage device has a plurality of flags, each flag capable of being set or unset, one flag corresponding to each cluster in the storage device, wherein the step of determining when a first of the cluster chains and a second of the cluster chains contain a common cluster includes the steps of:

for each cluster in the storage device;
      determining when the corresponding flag is set to indicate that the cluster is accessible from two cluster chains;
      determining that the cluster is cross-linked when the corresponding flag is set; and
      when the corresponding flag is unset, setting the corresponding flag.

3. The method of claim 1 wherein each cluster in the cluster chain refers to a next sequential cluster in the cluster chain, wherein the step of updating the first cluster chain includes the steps of:

setting the duplicated cluster to refer to the next sequential cluster in the cluster chain as indicated by the common cluster;

determining a previous cluster in the cluster chain of the cross-linked cluster; and modifying the previous cluster in the cluster chain to refer to the duplicated cluster.

4. The method of claim 1 further including the steps of:

for each uncrossed cross-linked cluster,
      determining when the uncrossed cross-linked cluster is a common cluster in two cluster chains; and
      uncrossing the uncrossed cross-linked cluster.

5. The method of claim 1 wherein a fixed number of cross-linked clusters is uncrossed at a time.

6. A method in a computer system for reattaching lost directories to a directory hierarchy, comprising:

identifying a plurality of lost directories;

for each of the plurality of the identified lost directories,
      determining whether the identified lost directory points to a parent directory that is also a lost directory; and
      when the identified lost directory does not point to a parent directory that is also a lost directory, creating an entry in a non-lost directory for the identified lost directory and storing a reference to the identified lost directory in the created entry whereby an identified lost directory that points to a parent directory that is also a lost directory has no entry created for it, but rather is accessible through the entry created for its parent directory.

7. A method in a computer system for repairing cross-linked clusters on a file storage medium by creating copies of the cross-linked clusters, the file storage medium having a first cluster chain and a second cluster chain that have a cross-linked cluster, the cross-linked cluster being further cross-linked with a third cluster chain, the method comprising:

identifying all cross-linked clusters;

for each cluster chain for which a copy of the identified cross-linked cluster is needed, storing an entry in a cross-linked array with an identification of the identified cross-linked cluster and an identification of a head of the cluster chain; and for each entry in the cross-linked array,
selecting the entry;
creating a cluster with a copy of data in the cross-linked cluster identified by the selected entry;
setting a parent cluster in the identified cluster chain of the selected entry to reference the created cluster; and
for each entry in the cross-linked array in which the entry identifies the cross-linked cluster of the selected entry, changing that entry to identify the created cluster, wherein when the entry in the cross-linked array that identifies the cluster that is cross-linked with the third cluster chain and that identifies the first cluster chain is processed and a cluster is created for the cluster that is cross-linked with the third cluster chain, the entry in the cross-linked array that identifies the cluster that is cross-linked with the third cluster chain and that identifies the second cluster chain is changed to identify the cluster that is created for the cluster that is cross linked with the third cluster chain so that the changed entry will correctly identify the currently cross-linked cluster.

8. A computer-readable storage medium for controlling a computer system to reattach lost directories to a directory hierarchy by performing the steps of:

identifying a plurality of lost directories;

for each of the plurality of the identified lost directories, determining whether the identified lost directory points to a parent directory that is also a lost directory; and
when the identified lost directory does not point to a parent directory that is also a lost directory, creating an entry in a non-lost directory for the identified lost directory and storing a reference to the identified lost directory in the created entry whereby an identified lost directory that points to a parent directory that is also a lost directory has no entry created for it, but rather is accessible through the entry created for its parent directory.

9. A computer-readable storage medium for controlling a computer system to uncross cross-linked clusters, each cluster being a part of a cluster chain, comprising the steps of:

determining when a first of the cluster chains and a second of the cluster chains contain a common cluster;

duplicating the common cluster; and updating the first cluster chain to refor to the duplicated cluster, wherein the second cluster chain continues to refer to the common cluster.

* * * * *